(12) United States Patent
Papatla et al.

(10) Patent No.: US 7,379,996 B2
(45) Date of Patent: May 27, 2008

(54) SYSTEM AND METHOD FOR WEB SERVER MIGRATION

(75) Inventors: Ram Papatla, Sammamish, WA (US); Peter Schenk, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 944 days.

(21) Appl. No.: 10/408,416

(22) Filed: Apr. 7, 2003

(65) Prior Publication Data
US 2004/0199609 A1   Oct. 7, 2004

(51) Int. Cl.
G06F 15/16 (2006.01)
G06F 15/173 (2006.01)
G06F 15/177 (2006.01)

(52) U.S. Cl. .............. 709/224; 709/218; 709/222; 709/232; 709/248

(58) Field of Classification Search .......... 709/217, 709/219, 225, 226, 228, 232, 310, 230, 203, 709/224, 229
See application file for complete search history.

(56) References Cited

U.S. PATENT DOCUMENTS

| | | | | |
|---|---|---|---|---|
| 5,894,554 A * | 4/1999 | Lowery et al. | ........... | 709/203 |
| 5,968,125 A * | 10/1999 | Garrick et al. | ........... | 709/224 |
| 6,192,407 B1 * | 2/2001 | Smith et al. | ........... | 709/229 |
| 6,324,580 B1 * | 11/2001 | Jindal et al. | ........... | 709/228 |
| 6,587,866 B1 * | 7/2003 | Modi et al. | ........... | 709/226 |
| 6,594,693 B1 * | 7/2003 | Borwankar | ........... | 709/219 |
| 6,938,039 B1 * | 8/2005 | Bober et al. | ........... | 707/8 |
| 7,028,079 B2 * | 4/2006 | Mastrianni et al. | ........... | 709/232 |
| 7,032,089 B1 * | 4/2006 | Ranade et al. | ........... | 707/204 |
| 7,065,541 B2 * | 6/2006 | Gupta et al. | ........... | 709/219 |
| 2002/0042818 A1 * | 4/2002 | Helmer et al. | ........... | 709/217 |
| 2003/0093468 A1 * | 5/2003 | Gordon et al. | ........... | 709/203 |
| 2003/0177150 A1 * | 9/2003 | Fung et al. | ........... | 707/204 |
| 2003/0182427 A1 * | 9/2003 | Halpern | ........... | 709/225 |
| 2003/0188036 A1 * | 10/2003 | Chen et al. | ........... | 709/310 |
| 2004/0055004 A1 * | 3/2004 | Sun et al. | ........... | 718/108 |
| 2004/0080558 A1 * | 4/2004 | Blumenau et al. | ........... | 347/19 |
| 2004/0083245 A1 * | 4/2004 | Beeler, Jr. | ........... | 707/204 |
| 2004/0205206 A1 * | 10/2004 | Naik et al. | ........... | 709/230 |

\* cited by examiner

Primary Examiner—Quang N. Nguyen
(74) Attorney, Agent, or Firm—Shook, Hardy & Bacon, L.L.P.

(57) ABSTRACT

The present invention is directed to a system and method for migrating web servers. More particularly, the present invention is directed to transferring configuration and content information from a source server to a target server, including any web sites, applications, features, directory structures and sever side extensions that existed on the source server. The present invention provides a modular script based tool, that can be incorporated or customized by an administrator as needed, and executed on any one of a number of operating platforms or systems. The tool of the present invention comprises an authentication module, a parser module, a work items module; and a verifier module. In combination, these modules obtain one or more informational items pertaining to a source web server, parse the one or more informational items to generate one or more task items, utilize the task items to perform a transfer, and perform health checks on the target server, to ensure the content and configuration of the target web server.

34 Claims, 10 Drawing Sheets

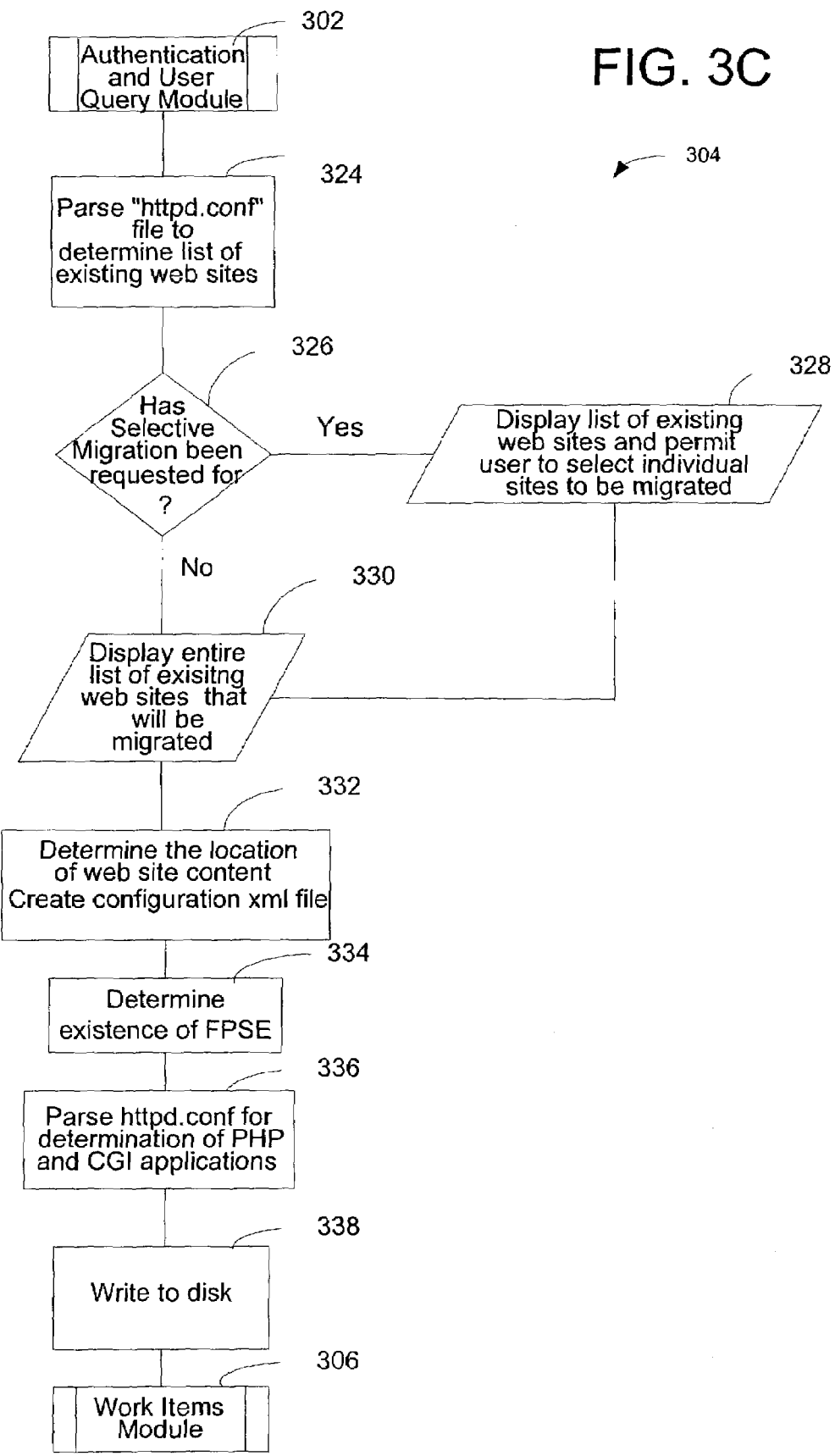

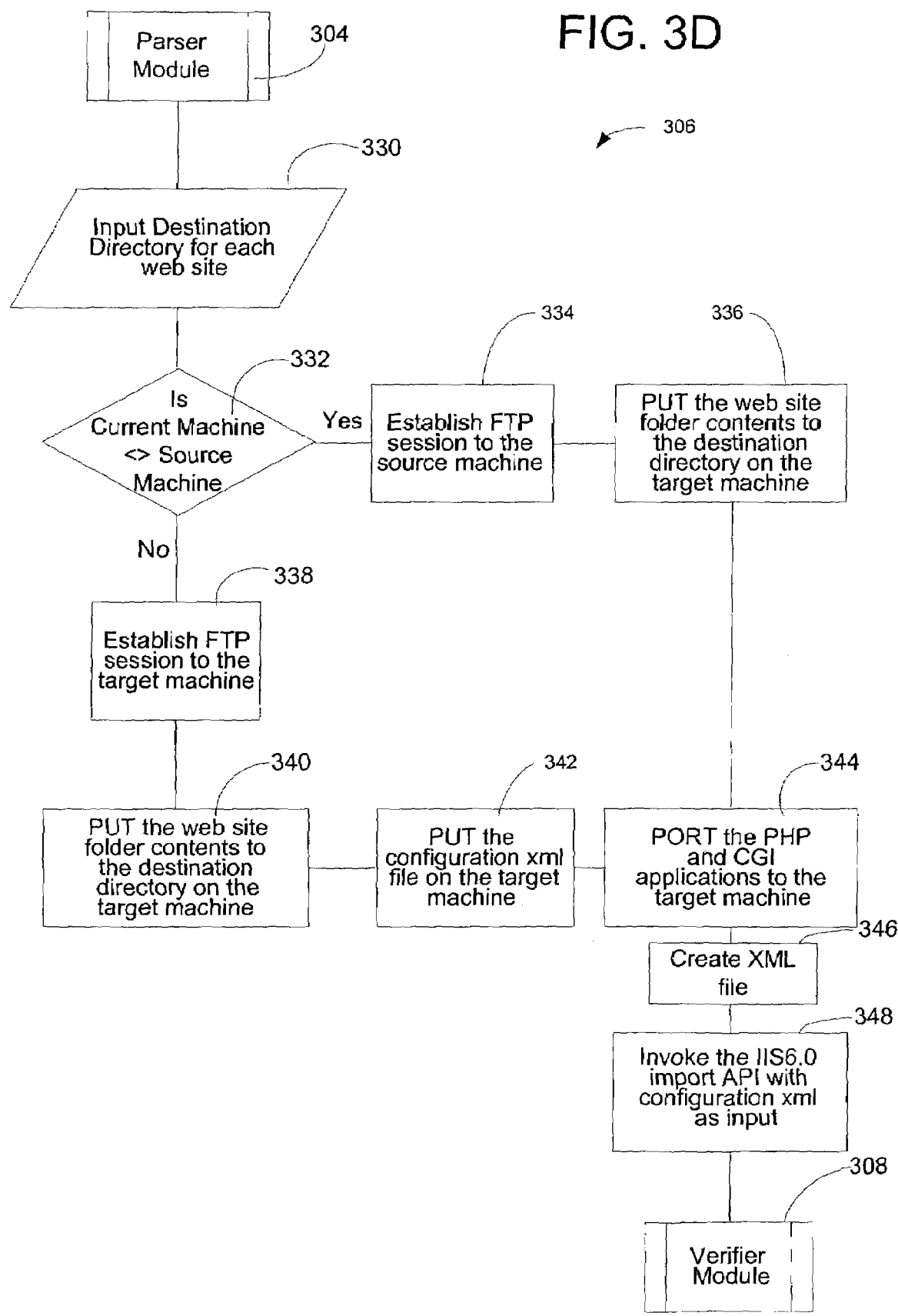

SYSTEM AND METHOD FOR WEB SERVER MIGRATION

CROSS-REFERENCE TO RELATED APPLICATIONS

None.

STATEMENT REGARDING FEDERALLY SPONSORED RESEARCH OR DEVELOPMENT

None.

TECHNICAL FIELD

The present invention is directed to a system and method for migrating web server content, configuration and resources between different servers including servers on different platforms. More particularly, the present invention provides a framework for developers to build on and incorporate into other products to facilitate web server migration.

BACKGROUND OF THE INVENTION

Over the last several years there has been tremendous growth of the Internet. This growth has been spurred by end user quests for data, information and products. In order to support this growth, there is a multiplicity of web sites scattered around the world and executing on a variety of software and hardware platforms. From time to time and for any one of a variety of reasons, there sometimes exists a need to migrate from one platform to another. For example, some web sites are hosted on an Apache web server running the Linux operating system, others are hosted on a Netscape enterprise network server running in a Windows environment and still other web sites operate on the Internet Information Server (IIS) on a Microsoft Window's network platform. It should be noted that these web server platforms are merely exemplary and are specified only to aid in the explanation of the present invention. When dealing with this variety of platforms, it may become necessary to migrate from one to another, as previously mentioned. There is therefore a need to provide an administrative tool to facilitate such migration.

One example of such a tool was the IIS migration wizard provided by Microsoft. This prior art system was provided to migrate from Netscape enterprise network server and Apache server to IIS version 5.0. Another objective of this prior art migration wizard was to facilitate an upgrade path within the IIS version of products. However, this tool along with other similar tools were problematic in that they attempted to do too much, were not intuitive and were not directed at the right type of administrator. For instance, the IIS migration wizard was a graphical user interface (GUI) based tool rather than a script or command line tool. While ordinarily this would not be perceived as a problem, it should be understood that the purpose of the tool was to enable an administrator who typically worked with command lines and scripts, to perform a migration of their existing server. Thus the intended user was faced with an unfamiliar interface. More importantly, the intended users are confronted with what they would consider to be a tool that limited their ability to customize the tool as needed. Beyond the problems discussed thus far, these prior art migration tools did not work. The tools tried to do way too much. The tools that were available to perform migration within a particular operating system platform such as Linux or Unix, could not be used to migrate web servers onto the Window's operating system platform.

What is needed is a migration tool that addresses the main features sought by administrators. First, the migration tool had to be in a language that administrators can relate to. For example, rather that providing an administrator with an executable black box file, a script file utilizing a language such as Perl either alone or in combination with some other scripting language would be preferable. Second, the migration tool must work when delivered. In other words, the migration tool has to be one that provides functionality without requiring too much effort from the administrator. Third, the migration tool must handle some basic migration tasks. Such tasks include the migration of server configuration, content of web sites and the migration of MIME types. And fourth, the migration tool should provide new key and innovative features. Such features include the ability to invoke the tool from any one of a variety of machines. The tool should be accessible from the source or target operating platform or from other intermediate systems. Intermediate machines are referred to as hosters. For example, the tool should operate on a computing device utilizing either Linux Windows. Even further, this tool should be capable of being invoked from either a source server computing device such as a server running Apache Linux or a destination server computing device such as a computer running Windows IIS. Another feature of such a tool, would be the migration of server extensions, such as for example Front Page Server Extensions (FPSE). Yet another feature would be the migration of user directories e.g. "www.mysite/~myname/*.htm" (a user's special directory). An even further feature would be the migration of .htaccess files. These files contain directory and file permission levels. These and other features are provided by the system and method of the present invention and will be discussed later in this document.

BRIEF SUMMARY OF THE INVENTION

The system and method of the present invention is directed to the migration of web sites. More particularly, the present invention is directed to transferring configuration and content information from a source server to a target server, including any applications, features and directory structures that existed on said source server.

In one aspect, the present invention is directed to a modular script based tool that can be incorporated or customized by an administrator as needed, and executed on any one of a number of operating platforms or systems.

In another aspect, the present invention is directed to a migration system and method that provided verification and intelligent recovery of the migration process.

In a further aspect, the present invention is directed to a source server that is an Apache web server executing on a computing device utilizing Linux, a target server that is an IIS 6.0 web server executing Windows .NET, and having server-side extension, such as Front Page Server Extensions.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means, instrumentalities and combinations particularly pointed out in the appended claims.

BRIEF DESCRIPTION OF THE SEVERAL VIEWS OF THE DRAWING

FIG. 3C is a flow diagram illustrating the parser module of the present invention.

FIG. 3D is a flow diagram illustrating the work items module of the present invention.

DETAILED DESCRIPTION OF THE INVENTION

The system and method of the present invention is directed to the migration of one or more web sites. The web sites are migrated to another web server executing in a second operating system environment. For purposes of illustration and explanation only and not limitation, the present invention will be described with respect to the migration of web sites on an Apache web server executing on a computing device utilizing Linux, to IIS 6.0 executing on a Windows .net server.

More particularly, the present invention provides the ability to migrate basic web content and server configuration. Even further, the present invention also provides the capability of migrating front page server extensions that exist on an Apache computing device, to an IIS 6.0 computing device. The system and method of the present invention automatically re-extends all webs and sub webs. Further still, the present invention provides innovative features which include the ability to migrate user directories and .htaccess files, a configurable destination directory, tcp port number migration, migration of IP based web sites and finally inclusion of intelligent recovery and help checking logic.

The particular embodiments described herein are intended in all respects to be illustrative rather than restrictive. Alternative embodiments will become apparent to those skilled in the art to which the present invention pertains without departing from its scope.

Having briefly described the invention, a computing environment suitable for practicing the invention will be described with reference to FIG. 1.

Exemplary Operating Environment

Figure 1:
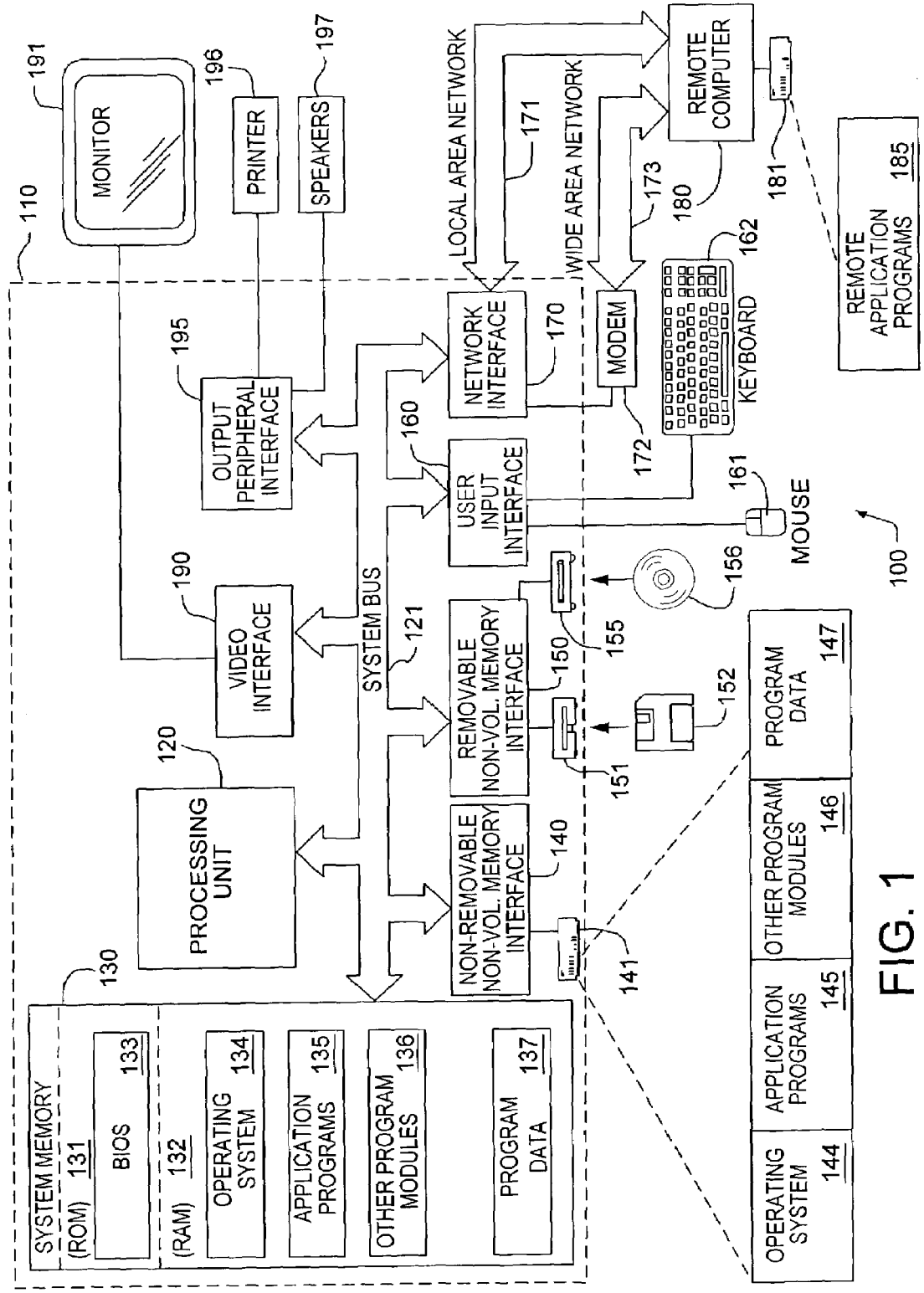
FIG. 1 is an exemplary environment for practicing the present invention.

Referring to the drawings in general and initially to FIG. 1 in particular, wherein like reference numerals identify like components in the various figures, an exemplary operating environment for implementing the present invention is shown and designated generally as operating environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including handheld devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. Examples of computer storage media include, but are not limited to, RAM, ROM, electronically erasable programmable read-only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Typically, the operating system, application programs and the like that are stored in RAM are portions of the corresponding systems, programs, or data read from hard disk drive 141, the portions varying in size and scope depending on the functions desired. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131 instructs the processing unit 120 to load the operating system, or necessary portion thereof, from the hard disk drive 140 into the RAM 132. Once the copied portion of the operating system, designated as operating system 144, is loaded in RAM 132, the processing unit 120 executes the operating system code and causes the visual elements associated with the user interface of the operating system 134 to be displayed on the monitor 191. Typically, when a user opens an application program 145, the program code and relevant data are read from the hard disk drive 141 and the necessary portions are copied into RAM 132, the copied portion represented herein by reference numeral 135.

Having described an exemplary environment for the system and method of the present invention, an exemplary embodiment will be discussed next with reference to FIGS. 2-4.

Web Server Migration

The system and method of the present invention is directed to the migration of web sites. While migrating server configuration information and site content is not a particularly difficult problem, the migration of a complete web server, on the other hand, can likely involve applications server extensions and features that may be present in the source environment but not necessarily supported in the destination environment. As such, particular attention to detail is required. In high volume hosting scenarios where administrators are charged with migrating several thousand web sites existing on one or more servers at once, the ability to handle server extensions and features is even more of an issue.

Figure 2:
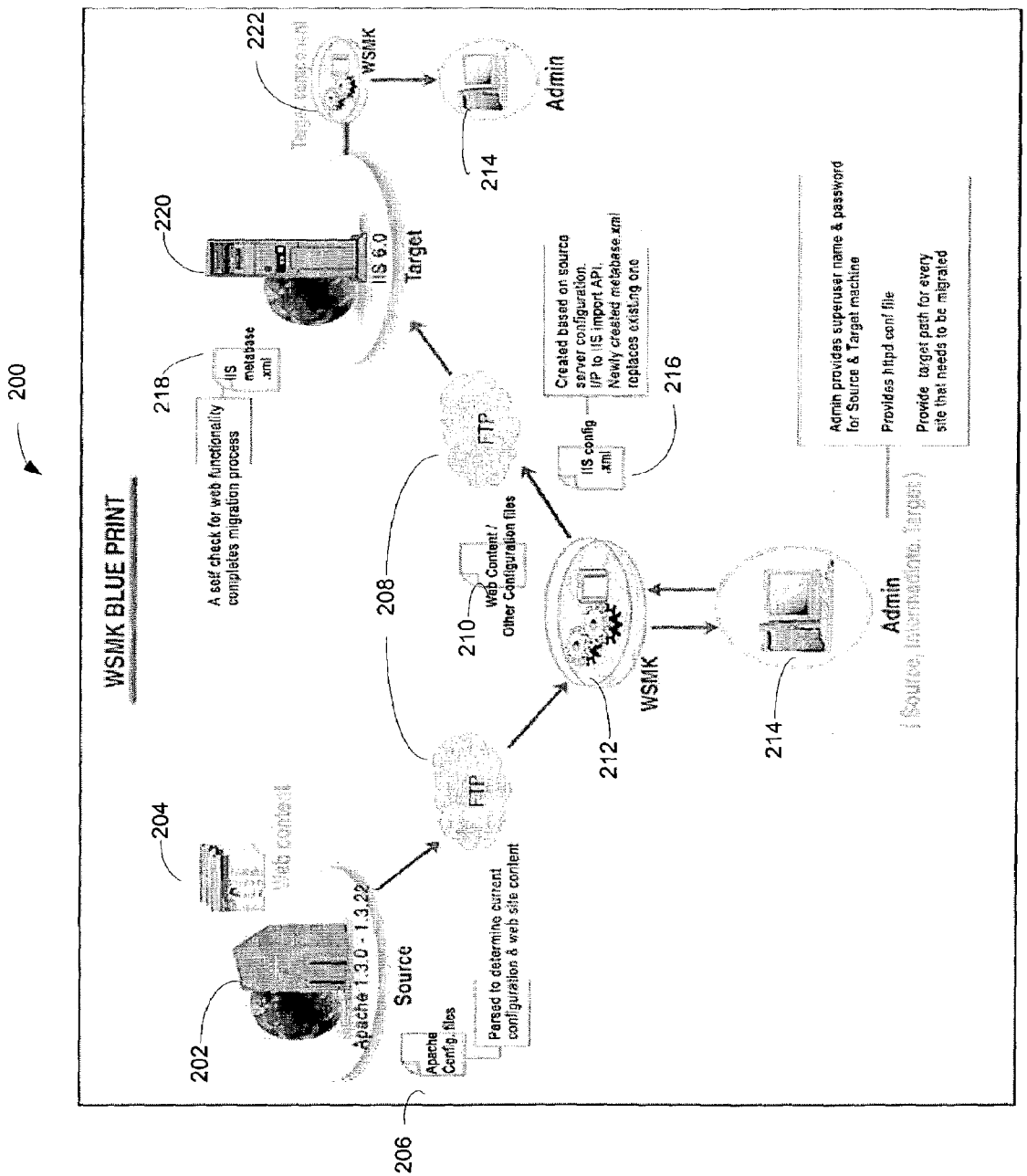
FIG. 2 illustrates a general architecture for the system and method of the present invention.

A general architecture illustrating the process of the present invention is shown in FIG. 2 and generally referenced as migration architecture 200. In the illustrative environment of architecture 200 several system components of the present invention are shown. In an embodiment of the present invention, a source web server 202 is shown as an Apache web server running on a Linux computing device. A target web server 220 is shown as an IIS 6.0 web server running on a Windows net computing device. Also shown is a representation of a web server migration kit component (WSMK) 212 and an administrator station 214.

The Apache source web server 202, contains among other things web content 204 and Apache configuration files (config.files) 206. The configuration files 206 generally describe the configuration of the server and the content of the sites.

The IIS 6.0 target server 220, contains among other things, IIS metabase 218, an Extended Markup Language XML schema file. Administrator station 214 provides an interface to the WSMK component 212 and the target component 218. In combination, migration engine WSMK 212 and its target migration component 222, enable the migration of one or more web sites from source server 202 to target server 220.

In operation, in the preferred embodiment of the system and method of the present invention, the Apache source server 202 is to be migrated to the IIS 6.0 target server 220. The migration engine WMSK 212 receives and processes information that is necessary to perform the migration. Administration station 214 initially provides super user names and passwords for both source server 202 and target server 220, to the migration engine WSMK 212. Administration station 214 also provides an httpd.conf file, a file that defines the web server that is to be migrated. Administrator station 214 further provides a target path on the IIS target server 220 for every site that needs to be migrated from the Apache server source 202.

In an embodiment of the present invention, migration is performed using File Transfer Protocol (FTP), for communications between the various source, target and intermediary systems. The use of this protocol is illustrated with clouds 208 within the general migration architecture 200. During a migration process, a configuration file (http-.conf)—Apache config.files 206 is parsed to determine the configurations and web site content 204 of the Apache source server 202. The parsed information, along with the httpd.conf file information provided via administrator station 214, is made available to the migration engine WSMK 212.

Through a process that will be discussed in more detail later in this document, migration engine WSMK 212, produces revised Web content/Configuration files 210, as well as an IIS config.xml file 216. It should be understood that the files 210 and 216, are created based on the configuration of the source server 202 and the protocol conversion Application Program Interfaces (APIs). The output files 210, 216 of the migration engine WSMK 212, are interpreted and utilized for the import and creation of web sites on IIS target server 220.

A WSMK target component 218 enables an administrator station 214 to access, alter and otherwise administer any of the configuration files or parameters that will result in the final IIS web site. As a final step in the migration process, a validation procedure is executed on the IIS target server 220 utilizing IIS metabase.xml 218.

Having provided an overview of the system and method of the present invention, the details of the component pieces for web server migration will be discussed with reference to FIGS. 3-4.

Figure 3A:
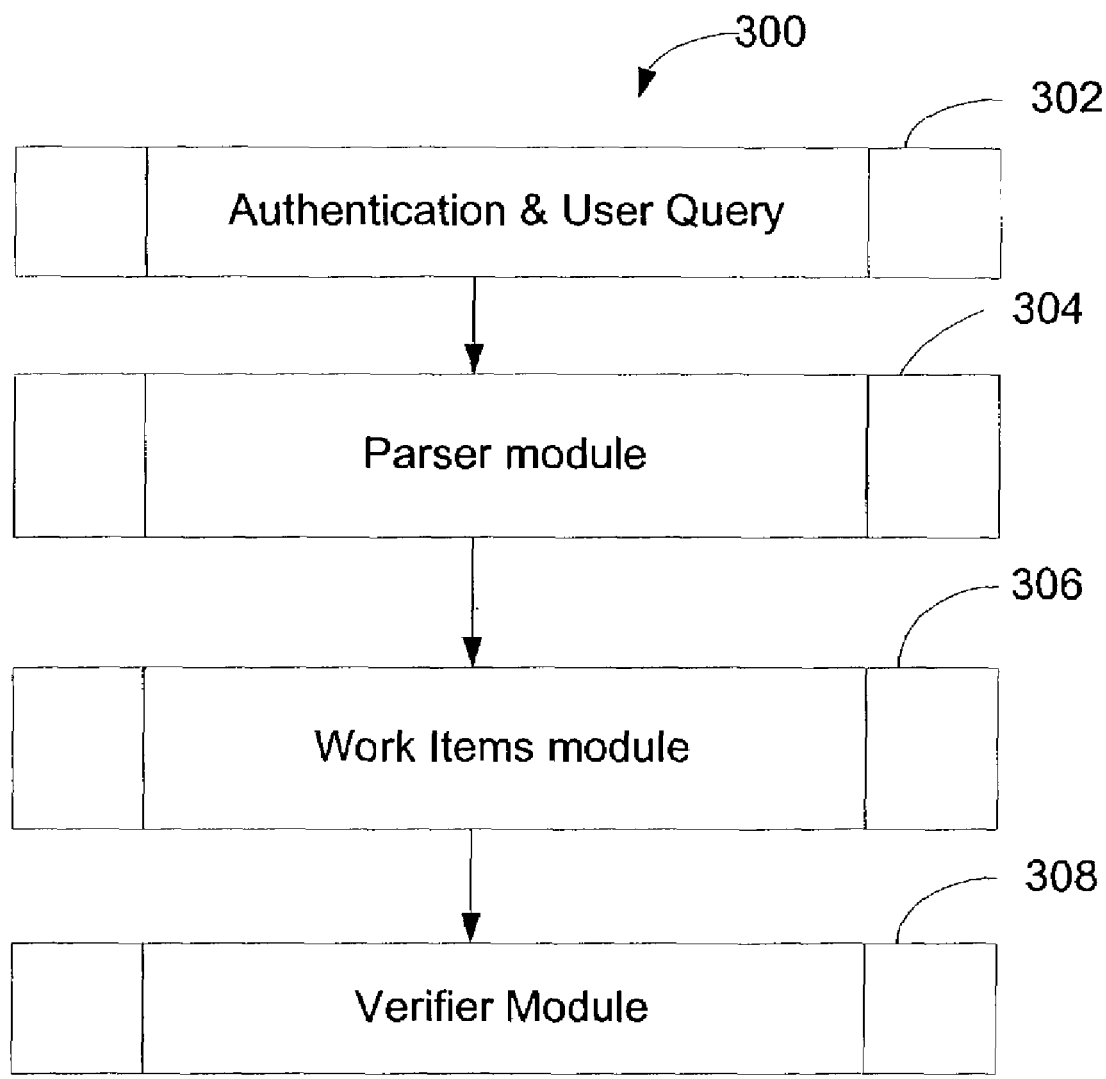
FIG. 3A is a flow diagram illustrating modules of the system and method of the present invention.

In the preferred embodiment, the present invention can be thought of as comprising four modules, shown in FIG. 3A and generally designated as system modules 300. However, those skilled in the art will recognize that the existence of the modules or the functions described for each of the modules, are merely to facilitate a description of the invention and in no way limit the scope of the invention. The modules can be further subdivided or combined without departing the scope of the invention. As implemented in an embodiment of the present invention, there are four modules. The four modules are namely authentication and user query module 302, parser module 304, work items module 306 and verifier module 308.

Authentication and user query module 302, prompts a user of the migration tool such as an administrator, to specify a source IP address and a target IP address, along with super user credentials for the source and target environments respectively. The complete path of the source—Apache server source 202, the web configuration file—Apache config.files 206 along with the server description file—httpd-.conf, are also taken as input. The authentication and user query module 302 determines the mode in which the migration tool is executing. In an embodiment of the present invention, the migration tool may execute in a 'fresh run' or 'recovery' mode. When executing in the fresh run mode, a local copy of the source server 202 description file (httpd-.conf) is obtained and a recovery file is created.

Parser module 304, reads information from the recovery file and proceeds to parse the local copy of httpd.conf file. Parsing of the local httpd.conf file includes among other things, the parsing of lists of websites and configuration files that are available on the source—Apache source server 202. Parsing results in the setup of a series of work items. Parser module 304 also creates a task file—tasklist.txt, which contains information on the files that need to be migrated between source and target machines and provides a way to track the progression of the migration.

Work items module 306 is responsible for transferring individual files from the source-Apache source server 202 to target-IIS target server 220, using the file transfer protocol (FTP). This module includes intelligence that enables the resumption of the migration of files during a recovery mode. Resumption of migration is achieved with the help of a temporary tasklist file that is created when the migration process begins execution. Work items module 306 actually consists of two parts. The first part operates as just described. The second part of the module is executed on the target machine. The primary function of the second part of the module is to call the IIS import API and pass a metabase.xml file to the import routines. This part of the module also ensures that the target web server reflects new settings, which are based on the site content that was migrated from the source server. Even further, the second part of the module is also responsible for creating users and associating access rights to those users on the target machine.

Verifier module 308 performs a series of health checks on the target machine to ensure that content and configurations that have been migrated from the source machine are consistent with the user's requirements. One such health check includes performing a simple get request for a web page on the target computing device. Thus in the preferred embodiment, a get request is performed on the IIS target server 220. A status report is generated by the verifier module to provide the details and process of the migration.

Figure 3B:
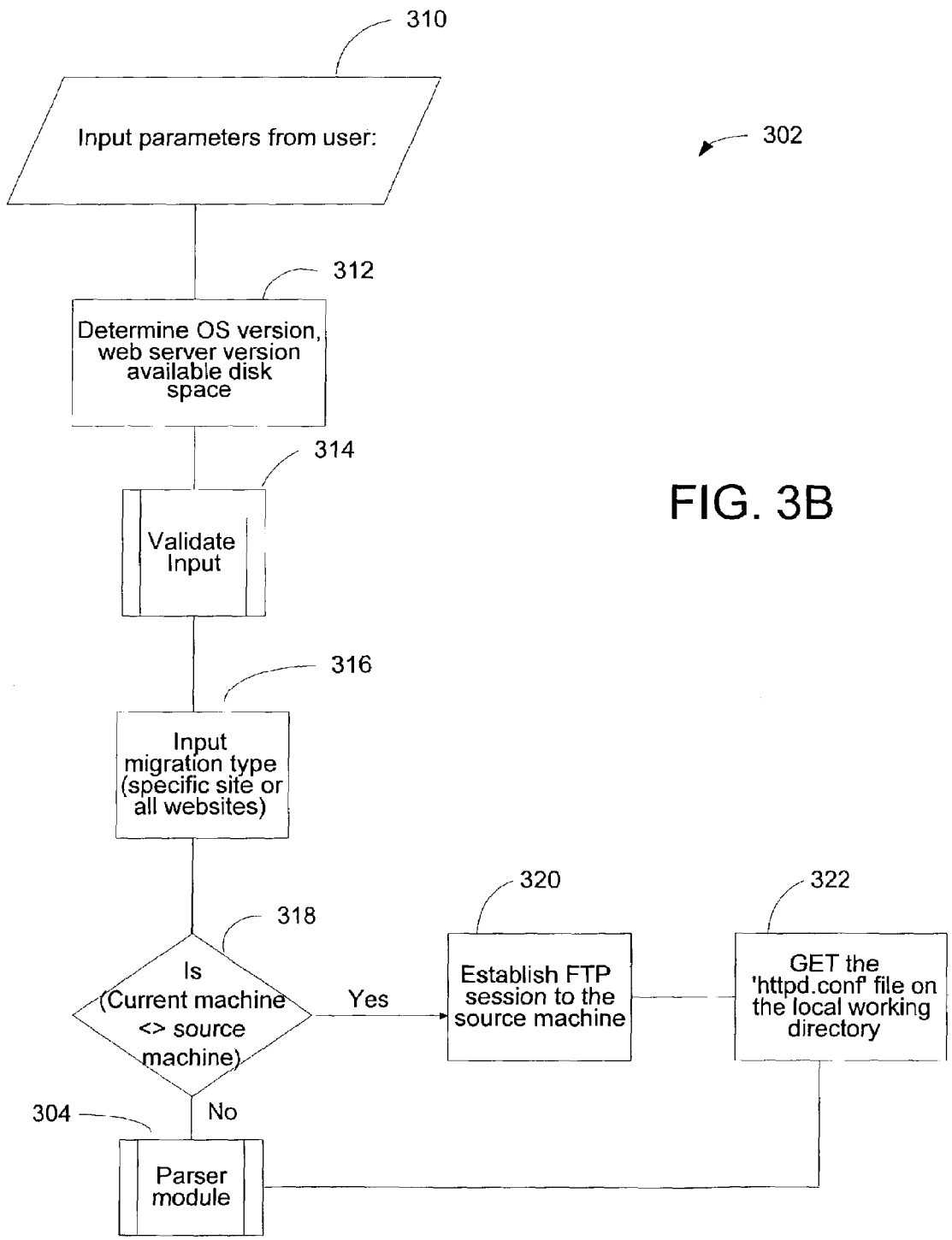
FIG. 3B is a flow diagram of the authentication and user query module of the present invention.

The detailed functions of the authentication and user query module 302 are illustrated in FIG. 3B. As previously mentioned, this module handles input of various command line parameters that are required to connect the source and target machine. In the case where an intermediary machine is being utilized, this module also establishes an FTP session to the source machine. At step 310, input parameters from a user including user credentials for source and target machines, location of the httpd.conf file, source machine name and target machine name are collected. A root user or administrator generally provides these input parameters. Next, operating environment information are determined at step 312. For example, the Operating System OS version and web server versions of the source and target machines are determined. In addition, the available disk space on the target machine is also determined. At step 314, the input parameters obtained at step 310 from the user are validated. Following validation, the type of input migration is determined at step 316. Input migration type identifies whether a specific site or all web sites on a source server should be involved in the migration process. Next, the module at step 318 makes a determination about whether the current machine on which the module is executing, is the source machine. If the module is indeed executing on the source machine, processing proceeds to step 304 where the parser module 304 is invoked. On the other hand, if the current execution environment is not the source machine then at step 320 an FTP session is established to the source machine. Following this, the httpd.conf file is obtained on the local working directory, at step 322. When this process is completed, the parser module is invoked, at step 304.

The parser module 304 is illustrated and discussed with reference to FIG. 3C. The parser module 304 parses the httpd.conf file to retrieve a list of web sites hosted on the source machine 202. Parser module 304 also persists to disk, the directory structures of the source machine 202 and corresponding directory content. As shown in FIG. 3C, the authentication and user query module 302 invokes at step 324, the parsing of the httpd.conf file. The parsing routine at step 324, also includes in an embodiment of the present invention, the locating of key Apache server directives. In the event that a selective migration has been requested as determined at step 326, a display list of existing source server 202 web sites is presented to the user, at step 328. From the display list, a user is able to select individual sites that are to be migrated to the target server 220.

In an embodiment of the present invention, a user is able to perform selective or batch migration. In other words, through the use of scripting, the user is able to migrate individual sites or all web sites on this source. Conversely, when selective migration has not been selected, a display of the entire list of existing web sites is provided, to notify the user of what will be migrated, at step 330.

Next, at step 332, the location of web site content on source server 202 is determined by examining the directives found within the httpd.conf file. Also at this step 332, a configuration XML file is also created. The configuration XML file maps server directives to equivalent IIS meta base property equivalents. The newly created XML file replaces the default XML file typically found in an IIS server.

At step 334, a determination is made regarding the existence of any Front Page Server Extensions (FPSE). The effect and migration of FPSE will be discussed later in this document with reference to FIGS. 4A-4C.

Returning to FIG. 3C, at step 336, parsing of the httpd.conf file is focused on identifying PHP and CGI applications. As would be understood by one skilled in the art, the PHP found in httpd.conf contains Linux specific calls for dynamic content. These calls must be converted to a version of PHP that is supported by the Windows operating system. Similarly, the location for any source CGI applications are identified and the contents are migrated after an end user has made required code changes and recompiled the program for the target environment.

At step 338, the relevant directory structures and web site content are written to the disk where the migration tool is executing. The process at step 338 also involves the generation of a task list. The migration process is then shifted to the work items module 306. Work items module 306 is shown in FIG. 3D. Work items module 306 migrates the required web sites and content to the configured destination directory. As shown, control passes from the parser module 304 to the first step 330 of the work items module 306. At step 330, an input of the destination directory for each web site is specified.

Next, at step 332, a determination is made as to whether the current machine executing the migration process is the source machine 202. If the current machine is not the source machine 202, processing passes on to step 334, in which an FTP session is established to the source machine 202. Once this connection exists, it is then possible at step 336, to execute a PUT operation, which places the web site folder contents into the destination directory on the target machine 202. On the other hand, if the current machine is the source machine, an FTP session is established to the target machine 220, at step 338. A PUT operation is performed at step 340, to place the web site folder contents into the destination directory on the target machine 220. In this scenario also, a PUT operation is executed to place the configuration XML file on the target machine, at step 342.

Regardless for whether or not the machine executing the migration module is the source machine or not, processing proceeds to step 344 in which PHP and CGI applications are ported to the target machine. This is followed by the creation of an XML file that will be utilized by the target IIS server, at step 346.

Next, at step 348, the IIS import API is invoked with the configuration XML file as an input parameter. The configuration XML file enables IIS to recognize the web site contents, configurations and applications. Also at this step 248 in the process, a back-up of the old configuration XML file is made in order to enable roll-back. Completion of the import process results in the verifier module 308 being invoked.

Figure 3E:
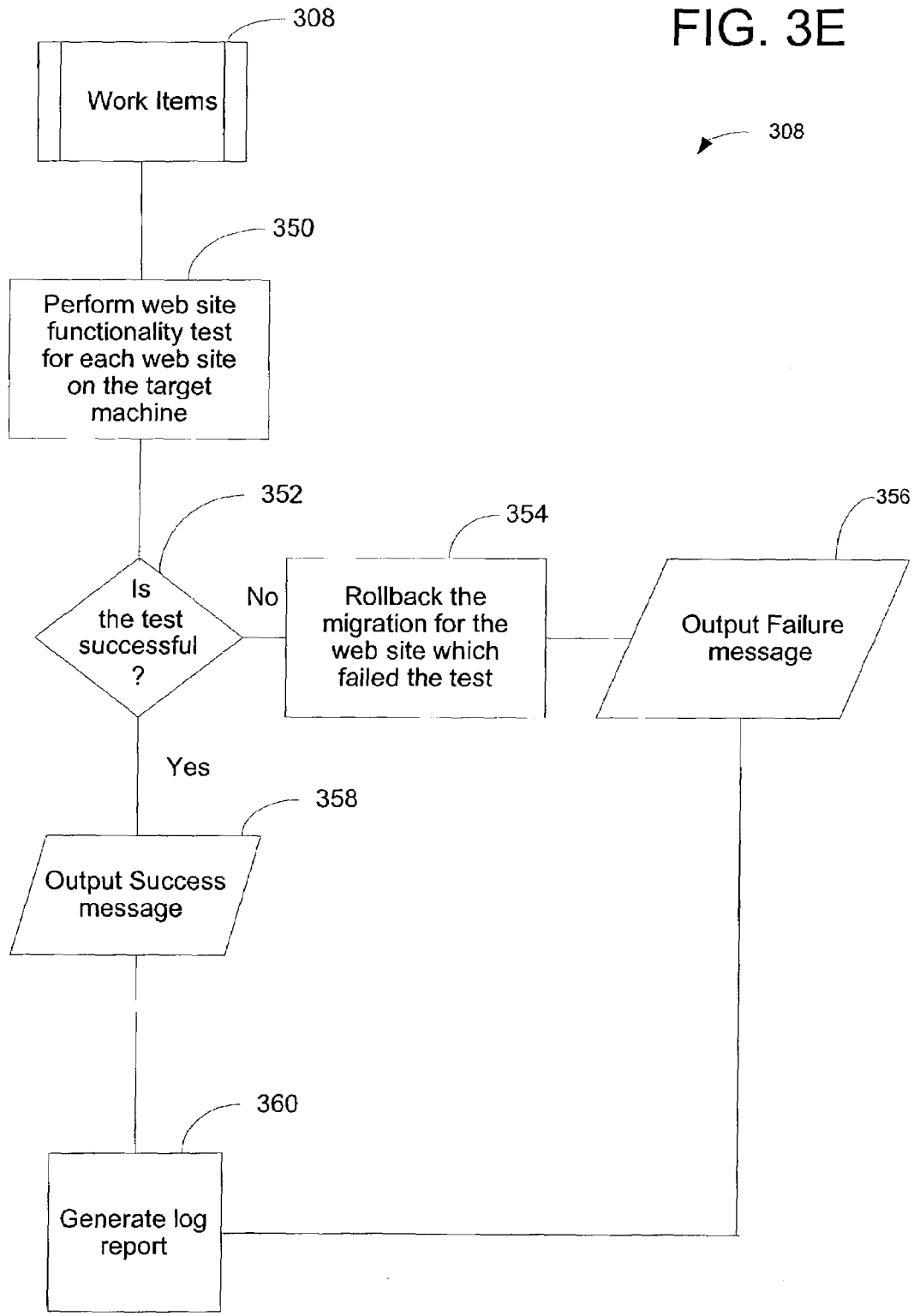
FIG. 3E is a flow diagram illustrating the verifier module of the present invention.

Verifier module 308 is illustrated in FIG. 3E. The verifier module 308 verifies the success of a migration by testing each and every migrated web site. Furthermore, the verifier module 308 generates a log report.

At step 350, a web site functionality test is performed for each web site on the target machine 220. Next, a determination is made with respect to the success of the test, at step 352. In the event that the test is unsuccessful, a roll-back of the migration for the particular web site that failed the test takes place, at step 354. This roll-back is then followed by the output of a failure message, at step 356. Conversely, if the test is successful, an output message of success is displayed, at step 358. In either case, a log report is generated, at step 360. In one embodiment of the present invention, all log reports are created and located in the directory from which the migration tool was executed.

Figure 4A:
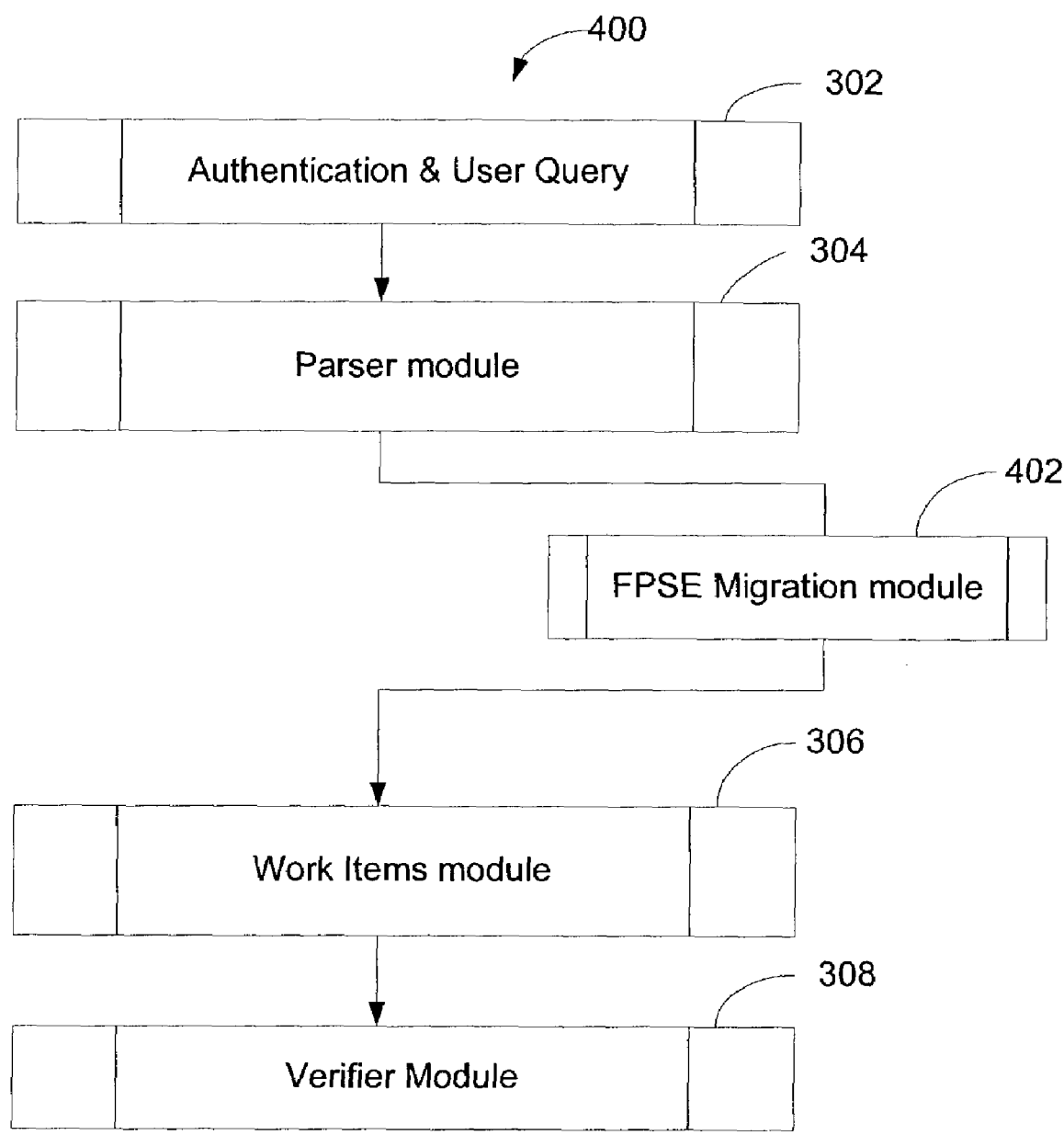
FIG. 4A illustrates an alternative architecture for the system and method of the present invention.

FIG. 4A illustrates system modules of another embodiment of the present invention. As shown, the system modules in this embodiment, generally referenced as 400 are similar to the architecture system modules 300 of FIG. 3A. The architecture system modules 400 of FIG. 4A include an additional module designated as FPSE migration module 402. The details of migration module 402 will be discussed with reference to FIGS. 4B-4D.

Figure 4B:
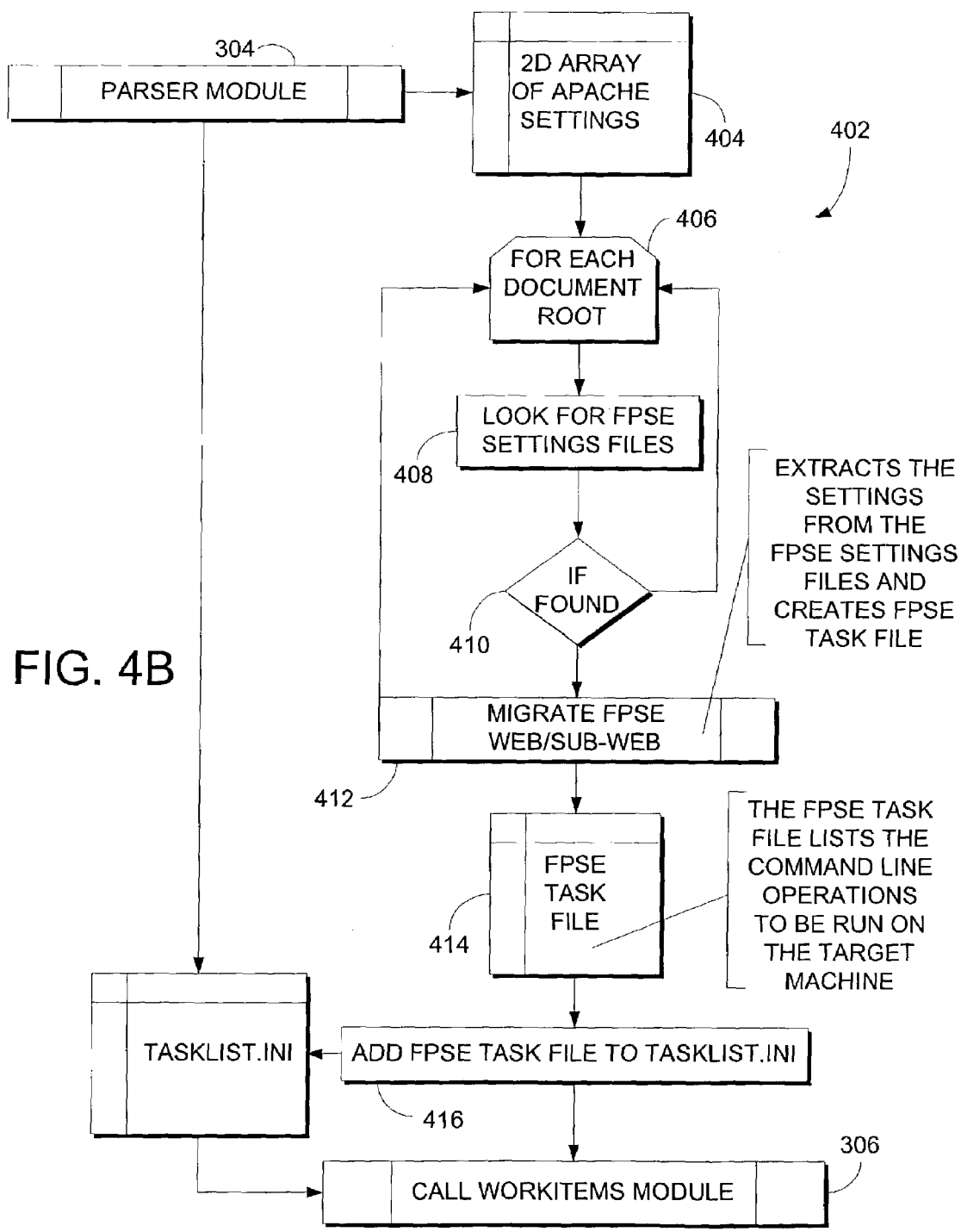
FIG. 4B is an illustrative flow diagram for the migration of front page server extensions.

FIG. 4B illustrates the details of the FPSE migration module 402. As illustrated, the entry point of this module is from the parser module 304. First, a two dimensional array of the settings of a source server 202 is created, at step 404. A processing loop is then initiated, at step 406 for each document found within the root of the source server 202. At step 408, the method of the present invention looks for FPSE setting files. A determination is then made if such files, at step 410. In the event that such a file is not found, processing returns to step 406 where the next document root will be searched. In the event that FPSE setting files are found, processing proceeds to step 412. Migration of FPSE web and sub web then occurs, at step 412. In particular, during this migration process, settings are extracted from the FPSE settings files and an FPSE task file is created, as shown at step 414. The FPSE task file lists the command line operations to be executed on the target machine 220. Next, at step 416, the FPSE task file is added to the task-list.ini file, which is ultimately processed by the work items module 306. The specific steps of the migration of FPSE web and sub web pages, at step 412 are provided in the separate flow diagram of FIG. 4C.

Figure 4C:
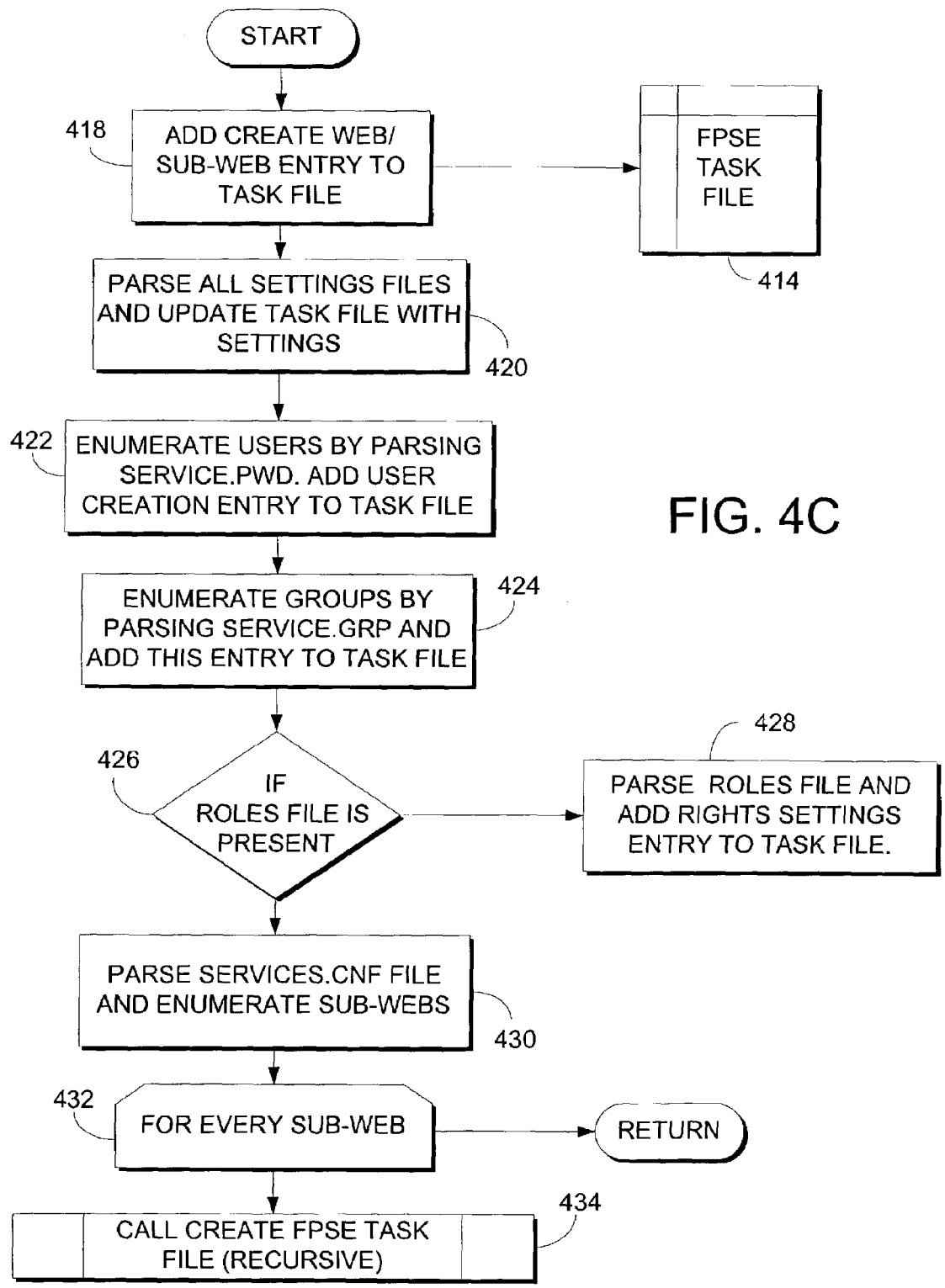
FIG. 4C illustrates the steps in the migration of a front page server extension web page along with the sub web pages.

FIG. 4C illustrates the steps implemented in an embodiment of the present invention to migrate FPSE web and sub web sites. The FPSE web/sub web migration process interacts with and populates the FPSE task file of step 414. As shown, at the start of the migration process 412, a process to add or create web/sub web entries to the task file is executed at step 418. Next, all settings files are parsed, and the task file is updated with target compliant settings, at step 420. Following this system, users are enumerated by parsing a file service.pwd, at step 422. An entry regarding the creation of a user is then added to the task file. Next, groups of users are enumerated by parsing the file service.grp and an entry is also made in the task file regarding the enumeration, at step 424. If a .roles file is present, as determined at step 426, the .roles file is parsed and settings concerning user specific roles are entered into the task file, at step 428. Conversely, if a rolls file is not present, a services.cnf file is parsed and sub websites are enumerated, at step 430. A recursive loop is set-up at step 432. Within the loop, a routine is called to create the FPSE task file recursively, at step 434.

The various modules and features discussed herein are implemented in a scripting language that is familiar to most administrators. This provides at least two major advantages and features over prior systems. First, administrators are able to access, inspect or customize the scripts as needed. Second, the scripts provide a basic framework and can be incorporated into other tools as needed to facilitate web server migrations. In other words, the basic framework of this migration tool is provided in the form of API's that can be utilized and incorporated into other tools.

What is claimed is:

1. A method for migrating a web server from a source server to a target server, comprising:
   creating a temporary tasklist file;
   transferring configuration and content information from said source server to said target server;
   transferring applications from said source server to said target server;
   transferring features from said source server to said target server; and
   providing on said target server directory structures that existed on said source server,
   wherein if transferring ceases, upon entering recovery mode, the method further comprises resuming transferring said configuration and content information, said applications, and said features, from said source server to said target server with intelligent recovery using the temporary tasklist file, and
   wherein transferring configuration and content information from said source server to said target server includes transferring Front Page Server Extensions and automatically re-extending webs and sub-webs associated with said Front Page Server Extensions on said target server.

2. The method as recited in claim 1, wherein said migration is performed utilizing one or more textual scripts.

3. The method as recited in claim 2, wherein said one or more textual scripts is based on Perl scripting language.

4. The method as recited in claim 2, wherein said one or more textural scripts is Vbscript.

5. The method as recited in claim 2, wherein said one or more textual scripts are executable on any one or more systems from the group comprising, a source server system, a target server system and an intermediary system.

6. The method as recited in claim 1, wherein said source server operates in a Linux operating system environment and said target server operates in a Windows Server operating system environment.

7. The method as recited in claim 1, further comprising transferring server extensions from said source server to said target server.

8. The method as recited in claim 1, wherein said migration method is provided through a command line interface.

9. The method as recited in claim 1, wherein said migration method is modularized to enable addition and removal of functionality by an administrator.

10. A computerized system for migrating web servers comprising:
    an authentication module;
    a parser module;
    a work items module;
    a verifier module; and
    one or more storage media for storing information associated with web server migration;
    wherein, said authentication module obtains one or more informational items pertaining to a source server that is to be migrated to a target server;
    wherein, said parser module parses said one or more informational items to generate one or more task items for the migration process;
    wherein, said work items module, utilizing said task items, transfers one or more configuration and data items of said source server to said target server, the one or more configuration and data items including Front Page Server Extensions;
    wherein, said work items module, utilizing said task items automatically re-extends webs and sub-webs associated with the Front Page Server Extensions on said target server;
    wherein, said verifier module performs health checks on said target server to ensure the content and configurations that results from said received one or more configuration and data items; and
    wherein if transferring ceases, upon entering recovery mode, said work items module resumes transferring said one or more configuration and data items of said source server to said target server with intelligent recovery using the one or more task items.

11. The computerized system as recited in claim 10 wherein, said one or more informational items is one from the group consisting of a source IP address, a target IP address, super user credentials for said source and target server environments, a path for the web configuration file of said source server and a description file of said source server.

12. The computerized system as recited in claim 10, that can be executed from a hoster.

13. The computerized system as recite in claim 12, wherein said modules are written in a scripting language.

14. The computerized system as recited in claim 13, wherein said hoster is a Linux operating environment.

15. The computerized system as recited in claim 13, wherein said hoster is a Windows operating environment.

16. A method in a computing environment, for migrating one or more web sites on a source server to a target server, comprising:
    creating a temporary tasklist file;
    migrating web pages and content of said one or more web sites;
    migrating server applications; and
    migrating server extensions of said one or more web sites,
    wherein if migrating ceases, upon entering recovery mode, the method further comprises resuming migrating said web pages and content of said one or more web sites, said server applications, and said server extensions of said one or more web sites with intelligent recovery using the temporary tasklist file, and
    wherein migrating server extensions of said one or more web sites includes migrating Front Page Server Extensions and automatically re-extending webs and sub-webs associated with said Front Page Server Extensions on said target server.

17. The method as recited in claim 16, further comprising migrating permission information of said one or more websites.

18. The method as recited in claim 16, further comprising migrating user directories of said one or more websites.

19. The method as recited in claim 16, wherein said source server operates in Linux operating system environment and said target server operates in Windows Server operating system environment.

20. The method as recited in claim 16, wherein said migration is performed utilizing one or more textual scripts.

21. A method for migrating a server side extension on a source server, to a target server, comprising:
locating and parsing settings files, which describe said server side extensions on said source server;
creating a temporary tasklist file;
migrating said server-side extension web and sub-web content;
creating a task file containing command line operations to be executed on said target server; and
utilizing said task file to transfer one or more information items to said target server from said source server, wherein said one or more information items are utilized to configure said server side extension on said target server,
wherein if migrating ceases, upon entering recovery mode, the method further comprises resuming migrating said server-side extension web and sub-web content with intelligent recovery using the temporary tasklist file, and
wherein migrating said server-side extension web and sub-web content includes migrating Front Page Server Extensions and automatically re-extending webs and sub-webs associated with said Front Page Server Extensions on said target server.

22. The method as recited in claim 21, further comprising enumerating users on said source server and utilizing the enumerated information to specify users on said target server.

23. The method as recited in claim 21, further comprising enumerating group on said source server and utilizing the enumerated information to specify groups on said target server.

24. The method as recited in claim 21, further comprising parsing files that specify user roles and rights on said source server and utilizing the pared information to specify similar roles on said target server.

25. The method as recited in claim 21 wherein, said source is an Apache web server executing on a computing device running Linux, said target server is an IIS 6.0 web server executing on a Windows Server.

26. A computer readable storage medium containing instructions stored thereon, executable by a computer processor, to perform a method for migrating a web server from a source server to a target server, the method comprising:
creating a temporary tasklist file;
transferring configuration and content information from said source server to said target server;
transferring applications from said source sever to said target server;
transferring features from said source server to said target server; and providing on said target server directory structures that existed on said source server,
wherein if transferring ceases, upon entering recovery mode, the method further comprises resuming transferring said configuration and content information, said applications, and said features, from said source server to said target server with intelligent recovery using the temporary tasklist file, and
wherein transferring configuration and content information from said source server to said target server includes transferring Front Page Server Extensions and automatically re-extending webs and sub-webs associated with said Front Page Server Extensions on said target server.

27. The computer readable storage medium of claim 26, wherein said migration is performed utilizing one or more textual scripts.

28. The computer readable storage medium of claim 26, wherein said instructions are provided as one or more textual scripts, wherein said one or more textual scripts are executable on any one or more systems from the group comprising, a source server system, a target server system and an intermediary system.

29. The computer readable storage medium of claim 26, wherein said migration method is provided through a command line interface.

30. The computer readable storage medium of claim 26, wherein said migration method is modularized to enable addition and removal of functionality by an administrator.

31. A computer system having a processor, a memory and an operating environment, the computer system operable to execute a method for migrating a web server from a source server to a target server, the method comprising:
creating a temporary tasklist file;
transferring configuration and content information from said source server to said target server;
transferring applications from said source server to said target server;
transferring features from said source server to said target server; and
providing on said target server directory structures that existed on said source server,
wherein if transferring ceases, upon entering recovery mode, the method further comprises resuming transferring said configuration and content information, said applications, and said features, from said source server to said target server with intelligent recovery using the temporary tasklist file, and
wherein transferring configuration and content information from said source server to said target server includes transferring Front Page Server Extensions and automatically re-extending webs and sub-webs associated with said Front Page Server Extensions on said target server.

32. A computer system having a processor, a memory and an operating environment, the computer system operable to execute a method for migrating one or more web sites on a source server to a target server, the method comprising:
creating a temporary tasklist file;
migrating web pages and content of said one or more web sites;
migrating server applications; and
migrating server extensions of said one or more web sites,
wherein if migrating ceases, upon entering recovery mode, the method further comprises resuming migrating said web pages and content of said one or more web sites, said server applications, and said server extensions of said one or more web sites with intelligent recovery using the temporary tasklist file, and wherein migrating server extensions of said one or more web sites includes migrating Front Page Server Extensions and automatically re-extending webs and sub-webs associated with said Front Page Server Extensions on said target server.

33. A computer readable storage medium containing instructions stored thereon, executable by a computer processor, to perform a method for migrating one or more web sites on a source server to a target server, the method comprising:

creating a temporary tasklist file;

migrating web pages and content of said one or more web sites;

migrating server applications from said source server to said target server; and migrating server extensions of said one or more web sites to said target sever, wherein if migrating ceases, upon entering recovery mode, the method further comprises resuming migrating said web pages and content of said one or more web sites, said server applications, and said server extensions of said one or more web sites with intelligent recovery using the temporary tasklist file, and wherein migrating server extensions of said one or more web sites to said target server includes migrating Front Page Server Extensions and automatically re-extending webs and sub-webs associated with said Front Page Server Extensions on said target server.

34. A computer system having a processor, a memory and an operating environment, the computer system operable to execute a method for migrating a server side extension on a source server, to a target server, the method comprising:

locating and parsing settings files on said source server;

creating a temporary tasklist file;

migrating said server-side extension web and sub-web content;

creating a task file containing command line operations to be executed on said target server; and utilizing said task file to transfer one or more data items to said target server from said source to be utilized to configure said server side extension on said target server, wherein if migrating ceases, upon entering recovery mode, the method further comprises resuming migrating said server-side extension web and sub-web content with intelligent recovery using the temporary tasklist file, and wherein migrating said server-side extension web and sub-web content includes migrating Front Page Server Extensions and automatically re-extending webs and sub-webs associated with said Front Page Server Extensions on said target server.

* * * * *